United States Patent [19]

Sowerby et al.

[11] Patent Number: 5,302,772
[45] Date of Patent: Apr. 12, 1994

[54] ALPHA-OLEFIN POLYMERS

[75] Inventors: Roger L. Sowerby, Mentor; Curtis R. Scharf, Wickliffe, both of Ohio

[73] Assignee: The Lubrizol Corporation, Wickliffe, Ohio

[21] Appl. No.: 991,833

[22] Filed: Dec. 16, 1992

Related U.S. Application Data

[63] Continuation of Ser. No. 362,631, Jun. 7, 1989, Pat. No. 5,210,362.

[51] Int. Cl.$^5$ .............................. C07C 2/20; C07C 2/22
[52] U.S. Cl. ................................... 585/532; 585/510; 585/520
[58] Field of Search .................... 585/520, 532, 510

[56] References Cited

U.S. PATENT DOCUMENTS

| | | | |
|---|---|---|---|
| 2,474,671 | 6/1949 | Hersberger | 260/85.3 |
| 2,488,736 | 11/1949 | Palmer | 260/85.3 |
| 2,521,431 | 9/1950 | Walsh et al. | 260/85.3 |
| 2,581,154 | 1/1952 | Walsh et al. | 260/85.3 |
| 2,644,798 | 7/1953 | Caffee et al. | 252/429 |
| 2,678,957 | 5/1954 | Fontana et al. | 260/683.15 |
| 3,317,500 | 5/1967 | Edwards | 260/93.7 |
| 3,317,501 | 5/1967 | Edwards | 260/93.7 |
| 3,342,883 | 9/1967 | Liston | 260/658 |
| 3,361,731 | 1/1968 | Furukawa et al. | 260/91.1 |
| 3,436,379 | 4/1969 | Hambling et al. | 260/80.7 |
| 3,450,786 | 6/1969 | Clough et al. | 585/532 |
| 3,876,722 | 4/1975 | Rossi et al. | 260/683 |
| 3,963,772 | 6/1976 | Takeshita | 260/485 |
| 3,999,960 | 12/1976 | Lauber et al. | 585/510 |
| 4,060,569 | 11/1977 | Woods et al. | 260/683.15 |
| 4,113,790 | 9/1978 | Cesca et al. | 260/683.15 |
| 4,162,233 | 7/1979 | Kramer | 252/429 |
| 4,288,649 | 8/1981 | McCaulay | 585/533 |
| 4,316,975 | 2/1982 | Takahashi et al. | 526/142 |
| 4,361,498 | 11/1982 | Sunada et al. | 526/144 |
| 4,439,539 | 3/1984 | Takitani et al. | 526/142 |
| 4,511,746 | 4/1985 | Miller | 585/323 |
| 4,533,782 | 8/1985 | Merijanian | 585/521 |
| 4,542,251 | 9/1985 | Miller | 585/533 |
| 4,558,170 | 12/1985 | Chea et al. | 585/532 |
| 4,605,638 | 8/1986 | Nowlin et al. | 526/129 |
| 4,611,037 | 9/1986 | Musch et al. | 526/135 |
| 4,613,712 | 9/1986 | Bridger | 585/10 |
| 4,642,230 | 2/1987 | Whitehead et al. | 424/15 |
| 4,642,410 | 2/1987 | Loveless | 585/522 |
| 4,929,800 | 5/1990 | Drago et al. | 585/532 |
| 4,956,122 | 9/1990 | Watts et al. | 252/565 |
| 4,968,853 | 11/1990 | Scharf | 585/532 |
| 5,210,362 | 5/1993 | Sowerby et al. | 585/520 |

FOREIGN PATENT DOCUMENTS

| | | |
|---|---|---|
| 736464 | 6/1966 | Canada . |
| 2257638 | 6/1973 | Fed. Rep. of Germany . |
| 7314421 | 11/1969 | Japan . |
| 812213 | 4/1959 | United Kingdom . |

*Primary Examiner*—Anthony McFarlane
*Attorney, Agent, or Firm*—Forrest L. Collins; David M. Shold; Frederick D. Hunter

[57] ABSTRACT

The invention pertains to a process for preparing a liquid polymer using a mixed catalyst system comprising a primary organo halide and a Lewis acid catalyst.

33 Claims, No Drawings

ALPHA-OLEFIN POLYMERS

This is a continuation of copending application(s) Ser. No. 07/362,631 filed on Jun. 7, 1989, now U.S. Pat. No. 5,210,362.

BACKGROUND OF THE INVENTION

1. Field of the Invention

This invention describes processes for preparing alpha-olefin polymers having particular viscosity characteristics and which are highly useful in drive train systems (gear, automatic transmission fluid, and the like) and hydraulic lubricant systems.

2. Introduction to the Invention

It is known that polymerized olefinic materials may be utilized as viscosity improving agents (commonly known as viscosity improvers) to prevent base oil stocks from thinning out at high temperatures or solidifying at low temperatures. If a base oil thins out at high temperatures then the essential lubricating characteristics of the composition can be lost. Thus, a viscosity improver is a material which at low temperatures retains fluidity (inhibits thickening or increasing viscosity) and at higher temperatures acts to maintain the viscosity of the entire fluid system as the temperature increases. It is highly desirable that a viscosity improver be shear stable. By being shear stable, it is meant that the viscosity improver under conditions of high shear does not degrade (undergo chain scission). If the viscosity improver is subject to high shear and chain scission, the effectiveness at high and low temperatures is reduced. The present invention deals with alpha-olefin polymers which are typically obtained from a binary catalyst system and which are highly shear stable.

U.S. Pat. No. 2,678,957 to Fontana et al issued May 18, 1954 describes the polymerization of olefinic hydrocarbons. The catalyst system in the Fontana patent is described as $AlBrX_2$ or $AlBr_2X$ where X is a halogen other than bromine. The foregoing catalyst is stated as being dissolved in a non-polymerizable hydrocarbon solvent and in using a promoter. The promoter is RY where R is hydrogen or an alkyl group and Y is halogen The monoalkylethylenes polymerized according to Fontana may be represented by the formula $RCH=CH_2$ where R is an alkyl group. Fontana describes monomer materials ranging from propylene to octadecene-1.

U.S. Pat. No. 4,113,790 issued Sep. 12, 1988 to Cesca et al teaches obtaining low molecular weight polymers by using an aluminum halide, and a halogen, metal halide or halogenated organic compound in a hydrocarbon solvent. Chen et al in U.S. Pat. No. 4,558,170 issued Dec. 10, 1985 describes polyisobutylene production using an aluminum chloride-hydrogen chloride catalyst system.

U.S. Pat. No. 4,162,233 issued Jul. 24, 1979 to Kramer describes a method for obtaining hydride transfer reaction products useful in isomerization and alkylation reactions. The stated acid systems utilized by Kramer are capable of stabilizing high concentrations of tertiary cations and further capable of forming carbonium ion salts including both dimeric and monomeric anions.

U.S. Pat. No. 3,436,379 issued Apr. 1, 1969 to Hambling et al describes the copolymerization of monoolefinically unsaturated hydrocarbons, having a slower polymerization rate than isobutene, and one or more conjugated dienes in the presence of a Friedel-Crafts catalyst, and a minor proportion of isobutene. U.S. Pat. No. 3,361,731 to Furukawa et al issued Jan. 2, 1968 describes the polymerization of vinyl ethers, styrene, alpha-methyl styrene and isobutylene with a catalyst system described as an aluminum halide etherate U.S. Pat. No. 2,488,736 issued to Palmer on Nov. 22, 1949 describes the polymerization of olefinic mixtures in the presence of a Friedel-Crafts catalyst of enhanced activity.

U.S. Pat. No. 2,474,671 to Hersberger issued Jun. 28, 1949 describes a process for the Friedel-Crafts polymerization of unsaturated hydrocarbons to produce polymer products which are stated to be have uniform composition and physical properties regardless of the degree of polymerization.

U.S. Pat. No. 2,521,431 issued to Walsh et al on Sep. 5, 1950 describes the polymerization of olefins. Walsh teaches that Friedel-Crafts catalysts may be utilized in the presence of an alkyl halide promoter for the polymerization reaction. Walsh states that the polymerization reaction may be improved by the addition of controlled amounts of water. U.S. Pat. No. 2,581,154 was issued to Walsh et al on Jan. 1, 1952. This Walsh patent describes the polymerization of low molecular weight unsaturated hydrocarbons in the presence of a Friedel-Crafts catalyst.

U.S. Pat. No. 2,644,798 to Calfee et al issued Jul. 7, 1953 states that olefinic polymerization processes, and in particular those using aluminum halide catalysts, may be improved by using such catalysts having a molar ratio of halogen to metal of less than 3 and further containing oxygen in the catalyst molecules. The oxygenated aluminum halides are stated to be dissolved in a low-freezing, non-complex-forming solvent. The solvents include such materials as methyl chloride, ethyl chloride, or propyl chloride or other mono- or polyhalogenated alkanes containing up to about 5 carbon atoms.

Edwards in U.S. Pat. No. 3,317,500 issued May 2, 1967 describes the production of hydrocarbon-insoluble elastomers obtained from 4-methyl-1-pentene. The polymerization of the subject olefin by Edwards is stated to take place in the presence of a catalyst which may be solid aluminum chloride or monoethyl aluminum chloride at temperatures at above $-20°$ F. ($-29°$ C). Various methyl halide solvents are described as being useful by Edwards in his process. U.S. Pat. No. 3,317,501 issued May 2, 1967 to Edwards contains similar disclosures.

It has been discovered in the present invention that shear stable liquid alpha-olefin polymers preferably being of a bimodal distribution may be obtained through the use of a catalyst system comprising a primary or secondary organo halide and a Lewis acid catalyst. The polymers are of low halide (halogen) content.

Throughout the specification and claims percentages and ratios are by weight, temperatures are in degrees Celsius and pressures are in KPa gauge unless otherwise indicated. Ranges and ratios given herein are exemplary and may be combined. To the extent that the references described herein are relevant, they are herein incorporated by reference.

SUMMARY OF THE INVENTION

The present invention describes a process for preparing a liquid polymer comprising contacting at least one alpha-olefin with a catalyst system comprising at least one primary or secondary organo halide and a Lewis acid catalyst in the presence of a halogenated solvent under polymerization conditions thereby obtaining the liquid polymer.

A further aspect of the invention is a process for preparing an alpha-olefin copolymer comprising contacting at least two alpha-olefins with a catalyst system comprising a primary or secondary organo halide and a Lewis acid catalyst under polymerization conditions employing a halogenated solvent thereby obtaining the alpha-olefin copolymer.

Yet another feature of this invention is a process for preparing a polymer comprising contacting at least one alpha-olefin with a catalyst system comprising a primary organo halide and a Lewis acid catalyst in the presence of a halogenated aprotic solvent at a temperature of about −15° C. to about 25° C.

DETAILED DESCRIPTION OF THE INVENTION

The present invention deals with obtaining alpha-olefin polymers which are particularly useful as shear stable viscosity improvers in a variety of oil based fluids. The alpha-olefin polymers obtained herein give fully formulated oils that are liquids having a viscosity of less than 150,000 cps at −40° C. The polymers are liquids at room temperature (22° C.) and have a viscosity of about 200–400 centistokes at 100° C. For instance, the liquid shear stable viscosity improvers obtained from the alpha-olefin polymers described herein are useful in lubricating oils such as for internal combustion engines, functional fluids such as hydraulic oils or as a thickener for a grease composition. The alpha-olefin polymers useful herein are as described below.

In particular, any alpha-olefin monomer may be utilized to prepare the alpha-olefin polymers. Alpha-olefin monomers are simply described by the formula $RCH=CH_2$. The group R is a hydrocarbyl residue comprising at least one additional carbon atom and any other non-interfering substituents and molecules. It is preferred that the group R be hydrocarbon based as is later described with regard to the preferable components for the alpha-olefin monomer. That is, R should be at least one carbon atom, and is preferably not an aromatic species such as styrene, e.g., the polymer is substantially free of aromatic content. The desired monomers are normal or linear. The polymers may be homopolymers, copolymers or terpolymers.

Typically, the alpha-olefin monomers will contain from about 4 to about 30 carbon atoms total. A more preferable range for the alpha-olefin monomer is one which contains a total of about 6 to about 16 carbon atoms. As previously noted, the alpha-olefin monomers are preferably hydrocarbon based. In particular, the alpha-olefin which contains 4 carbon atoms is preferably the simplest hydrocarbon species, e.g., 1-butene. Thus, the particularly desirable alpha-olefin monomers do not contain a second reactive vinyl group, e.g., 1,3-butadiene. It is further desirable that any additional unsaturation within the alpha-olefin monomer should also be minimized or eliminated.

Thus overall, the preferred species in the present invention is an alpha-olefin which contains a single vinyl group (olefin) at the terminus of the molecule (monoalpha-olefin). Specific examples of alpha-olefins which may be utilized herein are 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene and 1-octadecene. Also useful herein are small amounts of non-alpha-olefins. Thus, materials such as isobutylene $(CH_3)_2C=CH_2$ are useful herein. Typically, non-alpha-olefins should not be present at more than about 10%, preferably less than 5% by weight of the total olefin charge. The non-alpha-olefins may also be excluded from the monomer charge.

Branching in the olefin monomer away from the 1 and 2 carbon positions is also within the scope of the present invention. While branched alpha-olefins are not desired, they may be included at less than 10%, preferably less than 5% by weight. Branched alpha-olefins include 3-methyl, 1-pentene. It is preferred herein that the alpha-olefin not contain any tertiary carbons as these materials may be selectively unreactive in the process of the present invention.

Particularly useful in the present invention are mixtures of alpha-olefins. In particular, mixtures of the normal alpha-olefins: octene and dodecene; heptene and nonene; hexene and decene; and octene and tetradecene are useful when employed herein. Ternary mixtures such as the normal octene, dodecene and hexadecene may be used. A further desirable ternary mixture of alpha-olefins includes a mixture of the normal octene, dodecene and tetradecene.

Where binary mixtures of two alpha-olefins are utilized, they are typically present at from 5% to 95%, preferably 10% to 90% by weight of each of the alpha-olefins. Where ternary mixtures are employed, each of the alpha-olefins will be utilized at from about 5% to about 90%, preferably about 10% to about 70% of each of the monomers.

Copolymers are preferred and in particular the monomers have an average carbon sum between 8 and 12, preferably 9 to 11 carbon atoms. For example, a copolymer of a nine carbon monomer and an eleven carbon monomer averages ten carbon atoms. A copolymer of eight, twelve and fourteen carbon atoms averages a monomer content of 11.6. It is also preferred that the mean weight average monomer content fall with the above distribution.

The catalysts employed herein are a first catalyst system comprising a primary and/or secondary organo halide and a second system employing a Lewis acid catalyst.

The organo halides with which the present invention is concerned are of the general formula $$R_1R_2CHX$$

wherein X is a halogen, $R_1$ is a hydrocarbyl group and $R_2$ is $R_1$ or hydrogen. The value of X as a halogen may be any of the typically employed halogen atoms, e.g., fluorine, chlorine, bromine or iodine. Preferably, the halogen, X, will be chlorine or bromine and most preferably chlorine.

$R_1$ and $R_2$ (in a secondary organo halide) may be the same or different hydrocarbyl groups, provided that any hetero atoms within the hydrocarbyl groups are not deleterious to the desired catalyst function described herein. It is preferred that $R_1$ and $R_2$ are identical and, preferably are both alkyl. There is a further preference herein for having $R_1$ and $R_2$ being a straight chained or normal hydrocarbon group. The preferred groups are primary organo halide. It is further preferred that the total number of carbon atoms in the alkyl halide be about 4 to about 12 carbon atoms. Preferred organo halides are n-propyl halides, n-butyl halide, n-pentyl halide, sec-propylhalide, sec-butyl halide and mixtures thereof.

The second catalyst employed in the present invention is a Lewis acid catalyst. Simply stated, the Lewis acid catalyst is any material which catalyzes the desired reaction to obtain the alpha-olefin polymer and which is further described as a molecule or ion that can combine with another molecule or ion by forming a covalent bond with two electrons from the second molecule or ion. Specific examples of Lewis acid catalysts useful in the present invention include boron trifluoride, aluminum halides such as aluminum chloride, aluminum monochlorodibromide, aluminum bromide and aluminum monobromodichloride.

A halogenated aprotic solvent is typically utilized in practicing the process of the present invention. The halogenated solvent should not be reactive in the process. The solvent is a normally liquid material at 20° C. The solvent is also preferably a halogenated saturated hydrocarbon. Typically, the solvent utilized herein will be methylene chloride. Other suggested solvents include monobromomonochloromethane, methylenebromide, 1,2-dichloroethane, 1,1-dibromocyclopropane, 1,1-dichlorocyclopropane, cis 1,2-dichlorocyclopropane, trans 1,2-dichlorocyclopropane, cis 1,2-dibromocyclopropane, and trans 1,2-dibromocyclopropane.

The solvents utilized herein are preferably geminal dichloro compounds such as ethylene dichloride or methylene chloride.

The use of the halogenated solvent having a high dielectric constant results in less catalyst degradation with the result being polymers of high molecular weight. The halogenated solvents preferably have a dielectric constant (episilon) per *The Handbook of Chemistry and Physics* 53rd edition copyright 1972 of greater than 7.0, preferably greater than 8.0.

A further feature of the present invention is to conduct the polymerization reaction in the presence of an activating amount of a protic compound. Typically, the protic compound is water. The term activating amount as later discussed means that amount which promotes the overall polymerization reaction and is not such an amount as to substantially decrease the polymerization reaction or to inactivate the catalyst system.

An activating amount of the protic compound is typically less than 0.1%, preferably 0.0001% to 0.01%, by weight of the catalyst system.

REACTION VESSEL

The reaction vessel utilized in preparing the polymers of the present invention is typically either 0.95 cm 316 stainless steel or is a glass lined reactor. The reaction vessel is equipped with a mechanical stirring system, reservoir for the alpha-olefin to be polymerized and a feed inlet. Temperature measuring means such as a thermometer are also included together with a condenser, a cooling jacket, and the ability to maintain an inert atmosphere (preferably nitrogen). Alternatively, the cooling jacket for the reaction vessel may be utilized for heating the vessel during the reaction. However, as the polymerization reaction is exothermic and the general temperature conditions described herein are relatively low, it will be more common to cool the reaction vessel than to heat the same.

PROCESSING CONDITIONS

The Lewis acid catalyst is typically combined with the halogenated aprotic solvent if any and charged to the reaction vessel under a nitrogen blanket. The reaction vessel, as previously noted, is cooled to the desired temperature range typically from about $-20°$ C. to about 40° C., preferably about $-15°$ C. to about 25° C., most preferably about 15° C. to about 25° C.

The second aspect of the processing conditions of the present invention is the preparation of a solution of the alpha-olefin monomer and the organo halide. The mixture of the organo halide and the alpha-olefin is added incrementally to the stirred slurry of the Lewis acid catalyst.

The mixture within the reaction vessel is typically maintained at $\pm 5°$ C. of the original desired temperature range. By controlling the temperature of the reactants, it is possible to selectively obtain the alpha-olefin polymer mixture having the desired parameters. The reaction is typically conducted such that the polymerization is accomplished at from 0.1 to 5 hours, preferably 0.25 hours to about 3.5 hours.

After the polymerization is substantially complete, the catalyst system may be deactivated through the use of water and/or aqueous sodium hydroxide, ammonia or calcium hydroxide. The product is typically recovered by removing the excess aqueous phase followed by solvent stripping and filtration to yield the neat liquid polymer.

QUANTITIES OF REACTANTS

The organo halide catalyst and the Lewis acid catalyst are typically employed such that the final amount of each material present in the reaction mixture on a molar basis is about 1.0:0.1 to about 0.1:1.0, respectively. More preferably, the molar ratio of the catalysts is from about 5:1 to about 1:5, most preferably 2:1 to 1:2. It is noted that the Lewis acid catalyst is described as being present in its entirety in the initial phase of the reaction as described above. The Lewis acid catalyst may be added incrementally, however, the use of all of the catalyst at once is recommended.

The amount of the halogenated solvent utilized in relation to the Lewis acid catalyst on a molar basis is typically about 100:1 to about 5:1, more preferably about 80:1 to about 10:1, most preferably about 60:1 to about 15:1.

The total alpha-olefin monomer charge to the Lewis acid catalyst is typically about 150:1 to about 10:1 preferably from about 75:1 to about 20:1 on a molar basis. The suggested amounts of the alpha-olefin monomer to the organo halide catalyst may thus be derived from the foregoing ratios.

THE PRODUCT

The products obtained herein typically contain a polymodal molecular weight distribution and are primary bimodal. The modal distribution of the polymers indicates that there are peak molecular weight maximums at more than one point in the distribution of the molecular weight of the polymer.

Typically, the molecular weight of the polymers obtained in the present invention will be from about 2,000 to about 100,000 (Mn). The peak molecular weight maximums (Mn) in the bimodal distribution are typically at 2,000 to 5,000 for the lower molecular weight component and 50,000 to 75,000 for the higher component. More preferably, the peak molecular weight maximums are from 3,500 to 4,500 and from 55,000 to 65,000. The weight ratio of the lower molecular weight component to the higher molecular weight component is typically 95:5 to 70:30, and preferably 90:10 to 80:20. The polymers are substantially saturated. Typically, the bromine number of the polymer is less than 2, preferably less than 1, more preferably less than 0.75.

Typically the polymers will have a halogen (e.g. chlorine) content of less than 0.5%, more preferably less than 0.3% and most preferably less than 0.1% by weight. The halogen content often is negligible and may range from 0.0001% to 0.2% by weight of the polymer.

The molecular weight average and the number average molecular weight are determined as described below.

The number average molecular weight Mn, and the weight average molecular weight Mw are defined as follows.

The number average molecular weight is equal to the summation of the number of moles of each species times the molecular weight of each species divided by the summation of the number of moles of each species.

The weight average molecular weight is equal to the summation of the number of moles of each species times the molecular weight of each species squared divided by the summation of the number of moles of each species times the molecular weight of each species.

Typically, the Mn and Mw values for polyalkenes for purposes of this invention, are determined by gel permeation chromatography (GPC). This separation method involves column chromatography in which the stationary phase is a heteroporus, solvent-swollen polymer network of a polystyrene gel varying in permeability over many orders of magnitude. As the liquid phase (tetrahydrofuran) containing the polymer sample passes through the gel, the polymer molecules diffuse into all parts of the gel not mechanically barred to them. The smaller molecules "permeate" more completely and spend more time in the column; the larger molecules "permeate" less and pass through the column more rapidly. The Mn and Mw values of the polymers can be obtained by one of ordinary skill in the art by the comparison of the distribution data obtained to a series of calibration standards of polymers of known molecular weight distribution. For purposes of this invention, a series of fractionated polymers of isobutene, polyisobutene being the preferred embodiment, is used as the calibration standard.

For example, the Mw values disclosed herein are obtained using a Waters Associates model 200 gel permeation chromatograph equipped with a 2.5 ml syphon, a 2 ml sample injection loop and four stainless steel columns 7.8 mm in diameter by 120 centimeters long. Each column was packed with STYROGEL, a commercially available rigid, porous gel (in particle form) of crosslinked styrene/divinyl benzene copolymers. These gels are obtained from Waters Associates. The first column contains STYROGEL having a retention volume of $10^3$ A. The second and third columns contain STYROGEL having a retention size of 500 A. The fourth column contains STYROGEL having a retention volume of 60 A. The first column is connected to the sample loop with stainless steel tubing, 83.3 cm long. The first column is connected to the second with a 2.3 cm length of the stainless steel tubing. The second and third columns are each connected by 10.2 cm lengths of tubing. The fourth column is connected to the detector by a 25.4 cm length of tubing. All the connecting tubing is 1.6 mm in diameter.

Calibration standards were prepared by dialyzing a polyisobutylene sample having a specific gravity at 60° F. (15.5° C.) of 0.89 and a viscosity at 210° F. (99° C.) of 12.50 SUS. A sample of this polymer is fractionated by dialysis using a rubber membrane and a soxhlet extraction apparatus with refluxing petroleum ether as solvent. Eleven fractions were taken; one sample each hour for the first seven hours, then three samples each four hours, and finally the residue which did not permeate the membrane over a four hour period. The Mn of each fraction was measured using vapor phase osmometry and benzene solvent.

Each calibration sample is then chromatographed. Approximately 7 mg of sample is weighed into a small bottle which is then filled with 4 ml of reagent grade tetrahydrofuran. The sealed bottle is stored overnight before analysis. The afore-described liquid phase chromatrograph is degassed at 59° C. and a flow rate of 2.0 ml per minute of tetrahydrofuran maintained. Sample pressure is 180 psi (1280 KPa) and the reference pressure 175 (1210 KPa) psi. The retention time of each sample is measured. The Mw of each calibration sample is calculated from the Mn assuming the relationship 2 Mn=Mw. The retention times and Mw for each sample, which are shown in the following table, were plotted to provide a standardization curve. The Mn and Mw for sample polymers are then obtained using this curve and the methods described in "Topics in Chemical Instrumentation, Volumne XXIX, Gel Permeation Chromatography" by Jack Cages, published in The Journal of Chemical Education, Volume 43, numbers 7 and 8. (1966).

Polyalkenes having the Mn and Mw calibrated values discussed above are known in the art and can be prepared according to conventional procedures. Several such polyalkenes, especially polybutenes, are commercially available.

| RETENTION TIME VS. MOLECULAR WEIGHT | | | | | |
|---|---|---|---|---|---|
| Rt* | Mw | Rt | Mw | Rt* | Mw |
| 30 | 42240 | 40 | 638 | 50 | 229 |
| 31 | 26400 | 41 | 539 | 51 | 216 |
| 32 | 16985 | 42 | 453 | 52 | 202 |
| 33 | 10780 | 43 | 400 | 53 | 189 |
| 34 | 6710 | 44 | 361 | 54 | 178 |
| 35 | 4180 | 45 | 330 | 55 | 167 |
| 36 | 2640 | 46 | 304 | 56 | 156 |
| 37 | 1756 | 47 | 282 | | |
| 38 | 1200 | 48 | 264 | | |
| 39 | 865 | 49 | 246 | | |

*Rt = retention time in units of number of times syphon (2.5 ml) empties. The syphon empties every 2.5 minutes.

The products of the present invention are typically obtained as liquid materials at room temperature. The viscosity of the recovered product varies from about 150 to about 1000 cSt at 100° C. Preferably the viscosity of the material at the same temperature is from about 200 to about 400 cSt.

The following are suggested methods for preparing the polymers of the present invention.

EXAMPLE I

A 100 gallon (397 liter) reactor is equipped with a mechanical stirring system, monomer reservoir and feed inlet, thermometer, condenser, cooling jacket and N₂ atmosphere. A solution consisting of 69 kg 1-octene, 69 kg 1-dodecene and 0.88 kg normal butyl chloride was charged to the monomer feed reservoir. Water is present at about 0.025% weight of the total charge. To the stirred reactor is charged 91 kg dry methylene chloride and 2.55 kg anhydrous $AlCl_3$. This $AlCl_3$ slurry was cooled to 23° C., whereupon addition of the co-monomer/n-butyl chloride solution was initiated via the monomer feed inlet into the reactor over 3.5 hours. The polymerization temperature was maintained at 23° C.±1° C. After the co-monomer/n-butyl chloride charge was complete, the polymerization mixture was stirred for an additional 3.0 hours at 23° C.±1° C.

The $AlCl_3$ catalyst was neutralized by adding 28% aqueous NaOH solution into the product mixture with stirring at room temperature. After catalyst neutralization, the aqueous and organic phases were separated. The organic phase was stripped of solvent at 150° C. and filtered to give a 92% yield of a liquid 1-olefin copolymer having a bulk viscosity at 100° C. of 270 cSt. Gel permeation chromatography (polyisobutylene standard) indicates a copolymer $Mn=5040$, $Mw=17900$. A 20% wt. copolymer treatment of a 100N mineral oil gives a kinematic viscosity at 100° C. of about 14.2 cSt.

EXAMPLE II

A two liter reactor is equipped with a stirrer, addition funnel, thermometer, condenser and a cooling bath. A solution of 300 g (2.68 moles) 1-octene, 300 g (1.79 moles) 1-dodecene and 3.9 g (0.042 moles) normal butyl chloride was prepared and charged to the addition funnel. To the reactor was charged 300 ml. dry methylene chloride and 12.0 g anhydrous $AlCl_3$. A N₂ atmosphere was maintained throughout the polymerization procedure. The stirred $AlCl_3$ slurry was cooled to 15° C., whereupon a dropwise addition of the comonomer/n-butyl chloride solution was initiated and continued over 3.0 hours into the reactor. The polymerization temperature was maintained at 15° C.±1° C. After the comonomer/n-butyl chloride charge was complete, the polymerization mixture was stirred for an additional 3.0 hours at 15° C.

The catalyst was neutralized by adding a 22% by weight aqueous sodium hydroxide solution. After the neutralization, the aqueous and organic phases are separated. The organic phase is stripped of solvent at 150° C. and 10 mm Hg vacuum (1.33 KPa). The organic phase is then filtered to give a 92% yield of a liquid 1-olefin copolymer having a bulk viscosity at 100° C. of 317 cSt and a chloride content of 0.014% by weight. Gel permeation chromatography (polyisobutylene standard) indicates an $Mn=4580$, $Mw=38900$. A treatment of 20% wt. of this copolymer in a mineral oil blend gives a kinematic viscosity at 100° C. of about 16.6 cSt.

EXAMPLE III

A two liter reaction vessel was equipped as in Example II. A solution of 300 g (2.68 moles) 1-octene, 300 g (1.79 moles) 1-dodecene and 5.2 g (0.056 moles) secondary butyl chloride was prepared and charged to the addition funnel. To the reaction vessel was charged 300 ml. dry methylene chloride and 12.0 g (0.090 moles) anhydrous $AlCl_3$. An N₂ atmosphere was maintained throughout the polymerization. The stirred $AlCl_3$ slurry was cooled to 23° C., whereupon a dropwise addition of the comonomer/s-butyl chloride solution was initiated and continued over 2 hours into the reactor. The polymerization temperature was maintained at 23° C.±1° C. After the comonomer/s-butyl chloride charge was complete, the polymer mixture was stirred for an additional 2.0 hours at 23° C.±1° C.

The catalyst was neutralized by adding a 22% by weight aqueous sodium hydroxide solution. After the neutralization, the aqueous and organic phases are separated. The organic phase is stripped of solvent at 150° C. and 10 mm Hg vacuum (1.33 KPa). The organic phase is then filtered to give a 92% yield of a liquid copolymer having a bulk viscosity at 100° C. of 324 cSt and a chloride content of 0.013% by weight. Gel permeation chromatography (polyisobutylene standard) indicates an $Mn=4400$, $Mw=23400$. A treatment of 20% wt. of this copolymer in a mineral oil blend gives a kinematic viscosity at 100° C. of 17.0 cSt.

USAGE OF THE COMPOSITIONS

The shear stable viscosity improvers of the present invention are primarily useful in gear lubricating formulations. Gear lubricating formulations must provide a high degree of shear stability due to the intense mechanical action and close tolerances which the composition must endure during performance. Stated otherwise, shear stability is a measure of the ability of the viscosity improver to maintain its integrity. The integrity of the viscosity improver is its ability throughout the lubricant's life to maintain viscosity of the lubricant composition under conditions of high temperature, and to not interfere with gear function at low temperatures.

The formulation of the compositions of the present invention into a gear oil or engine lubricant are typically accomplished by blending from about 1% to about 40%, preferably about 5% to about 25% by weight of the viscosity improver of the present invention into a base oil stock. The products of the present invention may be combined into an oil product indirectly through the use of a diluent, e.g., a concentrate of the product, or by directly preparing the composition in combination with a suitable amount of an oil of lubricating viscosity. The oil of lubricating viscosity which is utilized in the preparation of the gear lubricants of the invention may be based on natural oils, synthetic oils, or mixtures thereof. Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydro-carbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecyl-benzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butyl-phenyl)silicate, hexyl-(4-methyl-2-pentoxy)disiloxane, poly(methyl)siloxans, poly(methylphenyl)siloxanes, etc.). Other synthetic lubricating oils include liquid esters of phosphorus-containing acids (e.g., tricresyl phosphate, trioxtyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil.

Refined oils are similar to the unrefined oils except they have been further treated in one or more purification steps to improve one or more properties. Many such purification techniques are known to those skilled in the art such as solvent extraction, secondary distillation, hydrotreating, hydrocracking, acid or base extraction, filtration, percolation, etc.

Rerefined oils are obtained by processes similar to those used to obtain refined oils which have been already used in service. Such rerefined oils are also known as reclaimed or reprocessed oils and often are additionally processed by techniques directed to removal of spent additives and oil breakdown products.

Friction modifiers such as a fatty phosphite may be included in gear oils. The phosphites are generally of the formula $(RO)_2PHO$. The preferred dialkylated phosphite as shown in the preceding formula is typically present with a mono-alkylated phosphite of the formula $(RO)(HO)PHO$. Both of these phosphites are concomitantly produced and thus mixture of the monophosphite and the di-phosphite is present.

In the above structure of the phosphite, the term "R" has been referred to as an alkyl group. It is, of course, possible that the alkyl is alkenyl and thus the terms "alkyl" and "alkylated", as used herein, embrace other than saturated alkyl groups within the phosphite. The phosphite utilized herein is thus one having sufficient hydrocarbyl groups to render the phosphite substantially oleophilic and further that the hydrocarbyl groups are preferably substantially unbranched.

Other friction modifiers which are useful herein are borated fatty epoxides, borated glycerol monocarboxylates, and borated alkoxylated fatty amines. Borated fatty epoxides are known from Canadian Patent 1,188,704 issued Jun. 11, 1985 to Davis. The oil-soluble boron-containing compositions of Davis are prepared by reacting at a temperature from about 80° C. to about 250° C.

(A) at least one of boric acid or boron trioxide with
(B) at least one epoxide having the formula

$$R^1R^2C[O]CR^3R^4$$

wherein each of $R^1$, $R^2$, $R^3$ and $R^4$ is hydrogen or an aliphatic radical, or any two thereof together with the epoxy carbon atom or atoms to which they are attached, form a cyclic radical, said epoxide containing at least 8 carbon atoms.

The borated amines are generally known from European published applications 84 302 342.5 filed Apr. 5, 1984 and 84 307 355.2 filed Oct. 25, 1984, both authored by Reed Walsh.

The borated amine friction modifiers are conveniently prepared by the reaction of a boron compound selected from the group consisting of boric acid, boron trioxide and boric acid esters of the formula $B(OR)_3$ wherein R is a hydrocarbon-based radical containing from 1 to about 8 carbon atoms and preferably from about 1 to about 4 carbon atoms with an amine selected from the group consisting of hydroxy containing tertiary. The borated amines correspond to the formulae

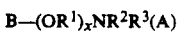

$$B—(OR^1)_xNR^2R^3 \quad (A)$$

and

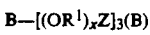

$$B—[(OR^1)_xZ]_3 \quad (B)$$

wherein Z is an imidazolene radical, $R^1$ in each formula is a lower alkylene based radical containing from 1 to about 8 carbon atoms, $R^2$ is a radical selected from the group consisting of hydrocarbon based radicals containing from 1 to about 100 carbon atoms and alkoxy radicals of the structure $H(OR^4)_y$— where $R^4$ is a lower alkylene based radical containing from 1 to about 8 carbon atoms, $R^3$ and $R^5$ (pendent from the ethylenic carbon in the 2 position in the imidazole (Z) radical) are each hydrocarbon based radicals containing from 1 to about 100 carbon atoms, x and y are each an integer ranging from at least 1 to about 50 and the sum of x+y is at most 75.

The borated fatty acid esters of glycerol are prepared by borating a fatty acid ester of glycerol with boric acid with removal of the water of reaction. Preferably, there is sufficient boron present such that each boron will react with from 1.5 to 2.5 hydroxyl groups present in the reaction mixture.

The reaction may be carried out at a temperature in the range of 60° C. to 135° C., in the absence or presence of any suitable organic solvent such as methanol, benzene, xylenes, toluene, neutral oil and the like.

Fatty acid esters of glycerol can be prepared by a variety of methods well known in the art. Many of these esters, such as glycerol monooleate and glycerol tallowate, are manufactured on a commercial scale. The esters useful are oil-soluble and are preferably prepared from $C_8$ to $C_{22}$ fatty acid or mixtures thereof such as are found in natural products. The fatty acid may be saturated or unsaturated. Certain compounds found in acids from natural sources may include licanic acid which contains one keto group. Most preferred $C_8$ to $C_{22}$ fatty acids are those of the formula RCOOH wherein R is alkyl or alkenyl.

The fatty acid monoester of glycerol is preferred, however, mixtures of mono- and diesters may be used. Preferably any mixture of mono- and diester contains at least 40% of the monoester. Most preferably, mixtures of mono- and diesters of glycerol contain from 40 to 60 percent by weight of the monoester. For example, commercial glycerol monooleate contains a mixture of from 45% to 55% by weight monoester and from 55% to 45% diester.

The amount of the friction modifier employed in the fluids of the present invention is typically from about 0.1% to about 5%, preferably from about 0.25% to about 4%, and most preferably from about 0.5% to about 3.5% by weight of the total composition.

A sulfurized olefin may be included in a lubricating product as an extreme pressure agent. Extreme pressure agents are materials which retain their character and prevent metal to metal damage, e.g., contact, when gears are engaged and meshed. The sulfurization of olefins is generally known as is evidenced by U.S. Pat. No. 4,191,659 as previously disclosed.

The sulfurized olefins which are useful in the present invention are those materials formed from olefins which have been reacted with sulfur. Thus, an olefin is defined as a compound having a double bond connecting two aliphatic carbon atoms. In its broadest sense, the olefin may be defined by the formula $R^1R^2C\!=\!CR^3R^4$, wherein each of $R^1$, $R^2$, $R^3$ and $R^4$ is hydrogen or an organic radical. In general, the R values in the above formula which are not hydrogen may be satisfied by such groups as —$C(R^5)_3$, —$COOR^5$, —$CON(R^5)$, —$COON(R^5)_4$, —COOM, —CN, —$C(R^5)\!=\!C(R^5)_2$, —$C(R^5)\!=\!Y$, —X, —YR or —Ar.

Each $R^5$ is independently hydrogen, alkyl, alkenyl, aryl, substituted alkyl, substituted alkenyl or substituted aryl, with the proviso that any two $R^5$ groups can be alkylene or substituted alkylene whereby a ring of up to about 12 carbon atoms is formed;

M is one equivalent of a metal cation (preferably Group I or II, e.g., sodium, potassium, magnesium, barium, calcium);

X is halogen (e.g., chloro, bromo or iodo);

Y is oxygen or divalent sulfur; and

Ar is an aryl or substituted aryl radical of up to about 12 carbon atoms.

Any two of $R^1$, $R^2$, $R^3$ and $R^4$ may also together form an alkylene or substituted alkylene group; i.e., the olefinic compound may be alicyclic.

The sulfurized olefins useful in the present invention as extreme pressure agents are typically utilized at from about 0.1% to about 5%, preferably from about 0.25% to about 4%, and most preferably from about 0.5% to about 3.5% by weight of the total lubricant composition.

Additional ingredients which may be included in the products of the present invention are fatty acid amides which are useful as additional friction modifiers, particularly for reducing the static coefficient of friction. Further useful components herein include seal swell agents such as sulfones and sulfolanes. Suitable seal swell agents are disclosed in U.S. Pat. No. 4,029,587 to Koch issued Jun. 14, 1977. A still further useful component in the present invention is a foam suppression agent such as a silicone oil. Any other typical ingredient may be included herein such as pour point depressants, dyes, odorants and the like.

A further useful ingredient herein is a sulfurized lower olefin such as isobutylene. Such materials are described in U.S. Pat. No. 4,191,659 issued to Davis on Mar. 4, 1980. The Davis materials may be added to gear oils at levels of 0.1% to 10% by weight.

Additional useful ingredients which may be employed in the lubricant are the following. These materials may be either combined directly into a lubricant product or may be precombined with one or more ingredients such as the polymer of the present invention. Such additional materials include, for example, detergents and dispersants of the ash-producing or ashless type.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at at a temperature about 50° C. and filtering the resulting mass.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 30 and preferably at least about 50 carbon atoms with nitrogen containing compounds such as amine, organic hydroxy compounds such as phenols and alcohols, and/or basic inorganic materials. Examples of these "carboxylic dispersants" are described in British Patent 1,306,529 and in many U.S. patents including the following:

| U.S. Pat. No. | INVENTOR | ISSUE DATE |
|---|---|---|
| 3,163,603 | Le Suer | December 29, 1964 |
| 3,184,474 | Catto | May 18, 1965 |
| 3,215,707 | Rense | November 2, 1965 |
| 3,219,666 | Norman et al | November 23, 1965 |
| 3,271,310 | Le Suer | September 6, 1966 |
| 3,272,746 | Le Suer et al | September 13, 1966 |
| 3,281,357 | Vogel | October 25, 1966 |
| 3,306,908 | Le Suer | February 28, 1967 |
| 3,311,558 | Prizer et al | March 28, 1967 |
| 3,316,177 | Dorer | April 25, 1967 |
| 3,340,281 | Brannen | September 5, 1967 |
| 3,341,542 | Le Suer et al | September 12, 1967 |
| 3,346,493 | Le Suer | October 10, 1967 |
| 3,351,552 | Le Suer | November 7, 1967 |
| 3,381,022 | Le Suer | April 30, 1968 |
| 3,399,141 | Clemens | August 27, 1968 |
| 3,415,750 | Anzenberger | December 10, 1968 |
| 3,433,744 | Le Suer | March 18, 1969 |
| 3,444,170 | Norman et al | May 13, 1969 |
| 3,448,048 | Le Suer | June 3, 1969 |
| 3,448,049 | Preuss et al | June 3, 1969 |
| 3,451,933 | Leister | June 24, 1969 |
| 3,454,607 | Le Suer | July 8, 1969 |
| 3,467,668 | Gruber et al | September 16, 1969 |
| 3,501,405 | Willette | March 17, 1970 |
| 3,522,179 | Le Suer | July 28, 1970 |
| 3,541,012 | Stuebe | November 17, 1970 |
| 3,542,680 | Le Suer | November 24, 1970 |
| 3,543,678 | Hobbs | December 1, 1970 |
| 3,567,637 | Sabol | March 2, 1971 |
| 3,574,101 | Murphy | April 6, 1971 |
| 3,576,743 | Widmer et al | April 27, 1971 |
| 3,630,904 | Musser et al | December 28, 1971 |
| 3,632,510 | Le Suer | January 4, 1972 |
| 3,632,511 | Chien-Wei Liao | January 4, 1972 |
| 3,697,428 | Meinhardt | October 10, 1972 |
| 3,725,441 | Murphy | April 3, 1973 |
| 4,234,435 | Meinhardt | November 18, 1980 |
| Re 26,433 | Le Suer | August 6, 1968 |

(2) Reaction products of relatively high molecular weight aliphatic or alicyclic halides with amines, preferably polyalkylene polyamines. These may be characterized as "amine dispersants" and examples thereof are described for example, in the following U.S. patents:

| U.S. Pat. No. | INVENTOR | ISSUE DATE |
|---|---|---|
| 3,275,554 | Wagenaar et al | September 27, 1966 |
| 3,438,757 | Honnen et al | April 15, 1969 |
| 3,454,555 | vander Voort et al | July 8, 1969 |
| 3,565,804 | Honnen et al | February 23, 1971 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

| U.S. Pat. No. | INVENTOR | ISSUE DATE |
|---|---|---|
| 2,459,112 | Oberright | January 11, 1949 |
| 2,962,442 | Andress | November 29, 1960 |
| 2,984,550 | Chamot | May 16, 1961 |
| 3,036,003 | Verdol | May 27, 1962 |
| 3,166,516 | Kirkpatrick et al | January 19, 1965 |
| 3,236,770 | Matson | February 22, 1966 |
| 3,355,270 | Amick | November 28, 1967 |
| 3,368,972 | Otto | February 13, 1968 |
| 3,413,347 | Worrel | November 26, 1968 |
| 3,442,808 | Traise | May 6, 1969 |
| 3,448,047 | Traise | June 3, 1969 |
| 3,454,497 | Wittner | July 8, 1969 |
| 3,459,661 | Schlobohm | August 5, 1969 |
| 3,461,172 | Previc | August 12, 1969 |
| 3,493,520 | Verdol et al | February 3, 1970 |
| 3,539,633 | Piasek et al | November 10, 1970 |
| 3,558,743 | Verdol et al | January 26, 1971 |
| 3,586,629 | Otto et al | June 22, 1971 |
| 3,591,598 | Traise et al | July 6, 1971 |
| 3,600,372 | Udelhofen et al | August 17, 1971 |
| 3,634,515 | Piasek et al | January 11, 1972 |
| 3,649,229 | Otto | March 14, 1972 |
| 3,697,574 | Piasek et al | October 10, 1972 |
| 3,725,277 | Worrel | April 3, 1973 |
| 3,725,480 | Traise et al | April 3, 1973 |
| 3,726,882 | Traise et al | April 10, 1973 |
| 3,980,569 | Pindar et al | September 14, 1976 |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| U.S. Pat. No. | INVENTOR | ISSUE DATE |
|---|---|---|
| 3,036,003 | Verdol | May 22, 1962 |
| 3,087,936 | Le Suer | April 30, 1963 |
| 3,200,107 | Le Suer | August 10, 1965 |
| 3,216,936 | Le Suer | November 9, 1965 |
| 3,254,025 | Le Suer | May 31, 1966 |
| 3,256,185 | Le Suer | June 14, 1966 |
| 3,278,550 | Norman et al | October 11, 1966 |
| 3,280,234 | Osborn | October 18, 1966 |
| 3,281,428 | Le Suer | October 25, 1966 |
| 3,282,955 | Le Suer | November 1, 1966 |
| 3,312,619 | Dale | April 4, 1967 |
| 3,366,569 | Norman et al | January 30, 1968 |
| 3,367,943 | Miller et al | February 6, 1968 |
| 3,373,111 | Le Suer et al | March 12, 1968 |
| 3,403,102 | Le Suer | September 24, 1968 |
| 3,442,808 | Traise et al | May 6, 1969 |
| 3,455,831 | Davis | July 15, 1969 |
| 3,455,832 | Davis | July 15, 1969 |
| 3,493,520 | Verdol et al | February 3, 1970 |
| 3,502,677 | Le Suer | March 24, 1970 |
| 3,513,093 | Le Suer | May 19, 1970 |
| 3,533,945 | Vogel | October 13, 1970 |
| 3,539,633 | Piasek et al | November 10, 1970 |
| 3,573,010 | Mehmedbasich | March 30, 1971 |
| 3,579,450 | Le Suer | May 18, 1971 |
| 3,591,598 | Traise | July 6, 1971 |
| 3,600,372 | Udelhofen | August 17, 1971 |
| 3,639,242 | Le Suer | February 1, 1972 |
| 3,649,229 | Otto | March 14, 1972 |
| 3,649,659 | Otto et al | March 14, 1972 |
| 3,658,836 | Vineyard | April 25, 1972 |
| 3,697,574 | Piasek et al | October 10, 1972 |
| 3,702,757 | Mehmedbasich et al | November 14, 1972 |
| 3,703,536 | Piasek et al | November 21, 1972 |
| 3,704,308 | Piasek et al | November 28, 1972 |
| 3,708,422 | Swanson | January 2, 1973 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| U.S. Pat. No. | INVENTOR | ISSUE DATE |
|---|---|---|
| 3,329,658 | Fields | July 4, 1967 |
| 3,449,250 | Fields | June 10, 1969 |
| 3,519,565 | Coleman | July 7, 1970 |
| 3,666,730 | Coleman | May 30, 1972 |
| 3,687,849 | Abbott | August 29, 1972 |
| 3,702,300 | Coleman | November 7, 1972 |

The term "minor amount" as used in the specification and appended claims is intended to mean that when a composition contains a "minor amount" of a specific material that amount is less than about 50% by weight of the composition.

The term "major amount" as sued in the specification and appended claims is intended to mean that when a composition contains a "major amount" of a specific material that amount is more than about 50% by weight of the composition. In relation to one another, a major amount of one component means that component is present in a greater amount than the component which is present in a minor amount.

A further desirable utility of the polymers of the present invention is in a hydraulic fluid. Typical ingredients in a hydraulic fluid include any or all of the above components useful in a lubricating oil.

A further feature of the present invention is the incorporation of about 0.1% to about 25%, preferably about 0.5% to about 20% by weight of the viscosity improver of the present invention in a grease. Greases are typically lithium, calcium or magnesium based fatty acids, in particular, the stearates.

The following are compositions prepared using the polymers of the present invention:

EXAMPLE IV

An all mineral oil based SAE 75W90 gear oil is prepared consisting of 68% wt. mineral oil+10% wt. Anglamol 6043$^a$)+1.0% wt. pour point depressant+21.0% wt. of the copolymer composition of Example I. The kinematic viscosity at 100° C. of this fully formulated, all mineral oil based multigrade gear oil lubricant is 13.4 cSt. ASTM D2983 viscosity (Brookfield at −40° C.) of this lubricant blend is 150,000 cPs.

EXAMPLE V

An all mineral based SAE 90 gear lubricant was formulated with 74% wt. 100N mineral oil+1% wt. pour point depressant+4% wt. Anglamol 99$^b$) additive+21% wt. of the copolymer composition of Example I. The kinematic viscosity at 100° C. of this blend is 14.4 cSt. Shear testing of this formulation was conducted using the Nieman (FZG) Four-Square Gear test rig. The conditions used are a stage 5 loading at 90° C. and 2900 RPM for 19 hours. The viscosities of the test formulation were determined before and after the procedure. The observed viscosity loss is less than 10%.
  a) Anglamol$^R$ 6043: is a conventional S/P gear oil performance additive
  b) Anglamol$^R$99 is a conventional S/P gear oil performance additive

What is claimed is:

1. A process for preparing a liquid polymer comprising contacting at least one alpha-olefin with a catalyst system comprising a primary organo halide and a Lewis acid catalyst in the presence of a halogenated solvent and in the presence of an activating amount of a protic compound under polymerization conditions thereby obtaining the liquid polymer.

2. The process of claim 1 wherein the alpha-olefin contains from 4 to about 30 carbon atoms.

3. The process of claim 1 wherein the Lewis acid catalyst is an aluminum halide.

4. The process of claim 1 which is conducted at about −20° C. to about 40° C.

5. The process of claim 2 wherein the halogenated solvent is methylene chloride.

6. The process of claim 1 wherein the polymer is substantially saturated.

7. The process of claim 1 wherein the organo halide is an alkyl halide selected from the group consisting of n-propyl halide, n-butyl halide, and n-pentyl halide, and mixtures thereof.

8. The process of claim 6 wherein the polymer is a copolymer obtained from alpha-olefins which contain about 6 to about 16 carbon atoms.

9. The process of claim 3 wherein the aluminum halide is aluminum chloride.

10. The process of claim 3 wherein the halogenated solvent is methylene chloride.

11. A process for preparing an alpha-olefin copolymer comprising contacting at least two alpha-olefins with a catalyst system comprising a primary organo halide and a Lewis acid catalyst under polymerization conditions employing a halogenated solvent thereby obtaining the alpha-olefin copolymer.

12. The process of claim 11 wherein the halogenated solvent is geminal substituted with the halogen.

13. The process of claim 11 wherein the alpha-olefins contain the average carbon sum of from 8 to 12 carbon atoms.

14. The process of claim 11 conducted in the presence of an activating amount of a protic compound.

15. The process of claim 11 wherein the halogenated solvent is methylene chloride.

16. The process of claim 11 wherein the Lewis acid catalyst is an aluminum halide.

17. The process of claim 11 wherein the primary organo halide is n-butyl chloride.

18. The process of claim 11 wherein at least one of the alpha-olefins contains from 6 to about 16 carbon atoms.

19. The process of claim 11 wherein the copolymer is substantially saturated.

20. The process of claim 11 wherein the alpha-olefin copolymer is a liquid at 20° C.

21. The process of claim 16 wherein the aluminum halide is aluminum chloride.

22. A process for preparing a polymer comprising contacting at least one alpha-olefin with a catalyst system comprising a primary organo halide and a Lewis acid catalyst in the presence of a halogenated aprotic solvent and in the presence of an activating amount of a protic compound at a temperature of about −15° C. to about 25° C.

23. The process of claim 22 wherein the primary organo halide is selected from the group consisting of n-propyl, n-butyl and n-pentyl chloride and mixtures thereof.

24. The process of claim 22 wherein the alpha-olefin contains from about 6 to about 16 carbon atoms.

25. The process of claim 22 wherein the temperature is between about 15° C. and about 25° C.

26. The process of claim 22 wherein the aprotic solvent is methylene chloride.

27. The process of claim 22 wherein the polymer is substantially saturated.

28. The process of claim 22 wherein the polymer is a liquid at 20° C.

29. The process of claim 22 wherein the aluminum halide is aluminum chloride.

30. The process of claim 22 wherein the polymer is a copolymer and provided further that at least one alpha-olefin used to obtain the copolymer contains from about 6 to about 16 carbon atoms.

31. The process of claim 1 wherein the protic compound is water.

32. The process of claim 14 wherein the protic compound is water.

33. The process of claim 22 wherein the protic compound is water.

* * * * *